(12) United States Patent
Conner et al.

(10) Patent No.: US 6,189,879 B1
(45) Date of Patent: Feb. 20, 2001

(54) THICKNESS MEASUREMENT APPARATUS

(75) Inventors: Charles Jeffrey Conner, Dayton; James Richard Schlough, Troy; Alan Scott Farr, Huber Heights, all of OH (US)

(73) Assignee: Heidelberger Druckmaschinen AG, Heidelberg (DE)

( * ) Notice: Under 35 U.S.C. 154(b), the term of this patent shall be extended for 0 days.

(21) Appl. No.: 09/188,238

(22) Filed: Nov. 9, 1998

(51) Int. Cl.$^7$ .................................................. B65H 43/08
(52) U.S. Cl. .................................. 270/52.15; 270/52.06; 270/58.03; 271/263
(58) Field of Search ........................ 270/52.15, 52.06, 270/52.26, 58.03; 271/262, 263; 198/502.2

(56) References Cited

U.S. PATENT DOCUMENTS

| | | | |
|---|---|---|---|
| 3,614,086 | * 10/1971 | Bushnell | ............ 271/263 X |
| 3,664,655 | * 5/1972 | McCain et al. | ............ 270/52.26 |
| 3,918,704 | * 11/1975 | Sugiyama et al. | ............ 271/263 X |
| 4,121,716 | * 10/1978 | Luperti et al. | ............ 271/263 X |
| 4,471,954 | 9/1984 | Bourg . | |
| 4,778,167 | * 10/1988 | Snow et al. | ............ 270/52.26 X |
| 5,125,642 | * 6/1992 | Orsinger et al. | ............ 271/262 |
| 5,171,005 | * 12/1992 | Manley et al. | ............ 270/52.26 X |
| 5,213,318 | 5/1993 | Newhall . | |
| 5,303,912 | * 4/1994 | Blank et al. | ............ 271/263 |
| 5,560,598 | * 10/1996 | Goldkuhle | ............ 271/263 |
| 5,622,268 | * 4/1997 | Conner et al. | ............ 270/52.26 X |
| 5,727,692 | * 3/1998 | Large et al. | ............ 271/263 X |
| 5,967,503 | * 10/1999 | Newsome | ............ 270/52.04 |

* cited by examiner

Primary Examiner—H. Grant Skaggs
Assistant Examiner—Patrick Mackey
(74) Attorney, Agent, or Firm—Burns, Doane, Swecker & Mathis, LLP

(57) ABSTRACT

An apparatus for measuring the thickness of flat products such as sheets or signatures, where the flat products are fed from a pile of signatures to a pocket by a pocket feeder. The apparatus has a light source and light sensor for sensing the light transmitted from the light source. The pocket feeder includes a first roller and second roller, the first roller being arranged against the second roller to form a nip therebetween for receiving flat product, wherein the first roller is deflectable when a flat product enters the nip. The apparatus includes a first reflecting element which is arranged on the first roller for reflecting incident light, a light source for directing light to said first reflecting element and a first sensor element for sensing light reflected from said reflecting element which produces a sensor signal. A calculating unit for calculating the thickness based on that sensor signal is also provided.

28 Claims, 4 Drawing Sheets

THICKNESS MEASUREMENT APPARATUS

TECHNICAL FIELD

This invention relates to an apparatus for the measurement of the thickness of flat products such as sheets or signatures and is particularly directed to an apparatus for measuring the thickness of sheets or signatures being fed by a feeding mechanism from a pile of signatures to a transport device such as a pocket feeder, in order to detect a malfunction of the feeding mechanism.

BACKGROUND OF THE INVENTION

In the technology of building books including booklets, magazines, periodicals, and so on, the use of collating systems is well known. These systems typically have a transporting device on which individual signatures are gathered to build a book-block set, which then is finished and bound. Typically a number of hoppers is arranged along the transporting device where each of the hoppers comprises a feeding mechanism for feeding an individual signature from a pile of signatures onto the transporting device, in order to progressively build up the book-block set. Such feeding mechanisms typically employ callipering devices for detecting a malfunction of any of the feeding mechanisms on a given line. Such a malfunction may, for example, result in a delivery of more or less than the intended number of sheets onto the transporting device.

To alleviate these problems, some efforts have previously been made to design collating systems having callipering devices for measuring the thickness of sheets being delivered from a pile of signatures to a transporting device. These calipers typically employ a mechanical feeder gauge which is calibrated to measure the thickness of the sheets being fed from a hopper to a transporting device. Such a thickness measurement device is for example known from U.S. Pat. No. 4,471,954, the disclosure of which is hereby incorporated by reference. This document discloses a transporting device in the form of a pocket feeder having a plurality of sheet loading pockets. Each of the pockets is associated with a sheet ejector for ejecting single sheets into a common sheet conveyor path from the respective pocket. A photo-electric sheet passage detector is mounted between each pocket and the common sheet conveyor path which generates a transparency or reflectivity signal of the sheet and which is compared to a stored averaged signal representative for a single sheet.

Another apparatus for measuring the thickness of sheets being fed from a hopper to a pocket feeder is known from U.S. Pat. No. 5,213,318, the disclosure of which is hereby incorporated by reference. The apparatus of U.S. Pat. No. 5,213,318 comprises a plurality of hoppers for holding signatures where the plurality of pockets is movable past the plurality of hoppers. Each of the pockets has a first fixed roller and a second movable roller being in contact with each other when no sheet is fed between the two rollers. When a flat product passes between the two rollers the second roller is deflected, where the amount of the deflection corresponds to the thickness of the product passing. In order to measure the thickness, the deflection of the second roller is measured. The second roller therefore is mounted on a movable shaft which comprises a plate on one of its ends. The plate is rotatable and arranged within a gap between a light source and a light sensor. Depending on the degree of rotation of the shaft the plate has a corresponding angular position and depending on this angular position it interrupts more or less light from the light source where the amount of interrupted light corresponds to the deflection the rollers.

The accuracy of this method however is limited due to the shadow-effects and due to the limited resolution of the light sensor. Furthermore, every pocket has to be provided with a separate light source.

SUMMARY OF THE INVENTION

It is an object of the present invention to increase the accuracy of the thickness measurement and to provide an improved method of measuring the thickness of flat products.

In summary, according to one aspect of the present invention, an apparatus for measuring the thickness of flat products such as sheets or signatures is disclosed, when the flat products are fed by a feeder from a pile of signatures to a receiving location. The feeder includes a first and a second roller where the first roller is arranged against the second roller to form a nip therebetween for receiving the flat product, wherein the first roller is deflectable when a flat product enters the nip. The apparatus further includes a first reflecting element being arranged on the first roller for reflecting incident light, a light source for directing light to said first reflecting element, a first sensor element for sensing light being reflected from said reflecting element and producing a sensor signal and a calculating unit for calculating the thickness based on that sensor signal.

Solutions according to the present are advantageous, since the present invention can measure the thickness of the flat products with high accuracy. Furthermore, the present invention can magnify the very slight movement of the first roller, which corresponds to the thickness of the flat product. This magnification is achieved without the use of mechanical parts which would cause undesirable vibrations and mass spring settling times.

According to further details of the present invention, the first and second roller and the first reflecting element as well as the first sensor element can be arranged on a movable transporting device, including movable receiving units, so-called compilers, which are a pocket and a pocket feeder. The light source and a calculating unit can be arranged stationary, apart from said movable transporting device. This separation of the components leads to the additional advantage that only one light source is needed.

According to another detail of the present invention, a second reflecting element can be attached to the moving transporting device, for example, to the moving pocket. The first and second roller and the first and second reflecting elements are arranged on the movable transporting device. An additional second sensor element can be provided and both the first and the second sensor elements can be arranged stationary apart from the pocket at a location where they can sense the light reflected from the first and second reflecting elements. When light, reflected from the first reflecting element falls onto the first sensor element a microcomputer begins to count the pulses generated by an encoder. The microcomputer stops counting as soon as light, reflected from the second reflecting element falls onto the second sensor element. As the number of counts refers to the thickness of the flat product the thickness can be calculated from the number of counts.

According to a further aspect of the invention, the apparatus for measuring the thickness of flat products can be used within an apparatus for forming sheet material assemblages, having a plurality of hoppers for holding sheet material, a plurality of receiving units each having a receiving location and feeding means for performing sheet feeding operations to feed sheet material from said hoppers to said receiving locations. The apparatus for forming sheet material can include driving means for sequentially moving each of said receiving units past each of said hoppers in turn and comprises a plurality of first reflecting elements for reflecting incident light, where one of said first reflecting elements is attached to each of said feeding means. One of a plurality of sensor elements is arranged on each of said plurality of receiving units for sensing light reflected from one corresponding reflecting element. A light source for directing light to said first reflecting elements is arranged apart from the receiving units.

According to another aspect of the present invention the apparatus for measuring the thickness of the flat products includes a plurality of hoppers for holding sheet material, a plurality of receiving units each having a receiving location and feeding means for performing sheet feeding operations to feed sheet material from said hoppers to said receiving locations. The apparatus can further include driving means for sequentially moving each of said receiving units past each of said hoppers in turn and comprises a plurality of first reflecting elements for reflecting incident light from a light source. One of said first reflecting elements is attached to each of said feeding means. The apparatus comprises a plurality of second reflecting elements for reflecting incident light from a light source, where one of said second reflecting elements is attached to each of said receiving units. A light source for directing light to said first and second reflecting elements is arranged stationary, apart from the receiving units. A first sensor element for sensing the light reflected from one of the plurality of the first reflecting elements where the sensor element is arranged stationary, apart from the receiving units as well as a second sensor element for sensing light reflected from one of the plurality of the second reflecting elements. An encoder for generating pulses is arranged stationary, apart from the receiving units and a microprocessor is arranged stationary, apart from the receiving units which monitors the pulses of said encoder and said first and second sensor signal.

BRIEF DESCRIPTION OF THE DRAWINGS

The foregoing and other features of the present invention will become apparent to one skilled in the art upon a consideration of the following description of the invention with reference to the accompanying drawings, wherein.

DESCRIPTION OF THE PREFERRED EMBODIMENT

Figure 1:
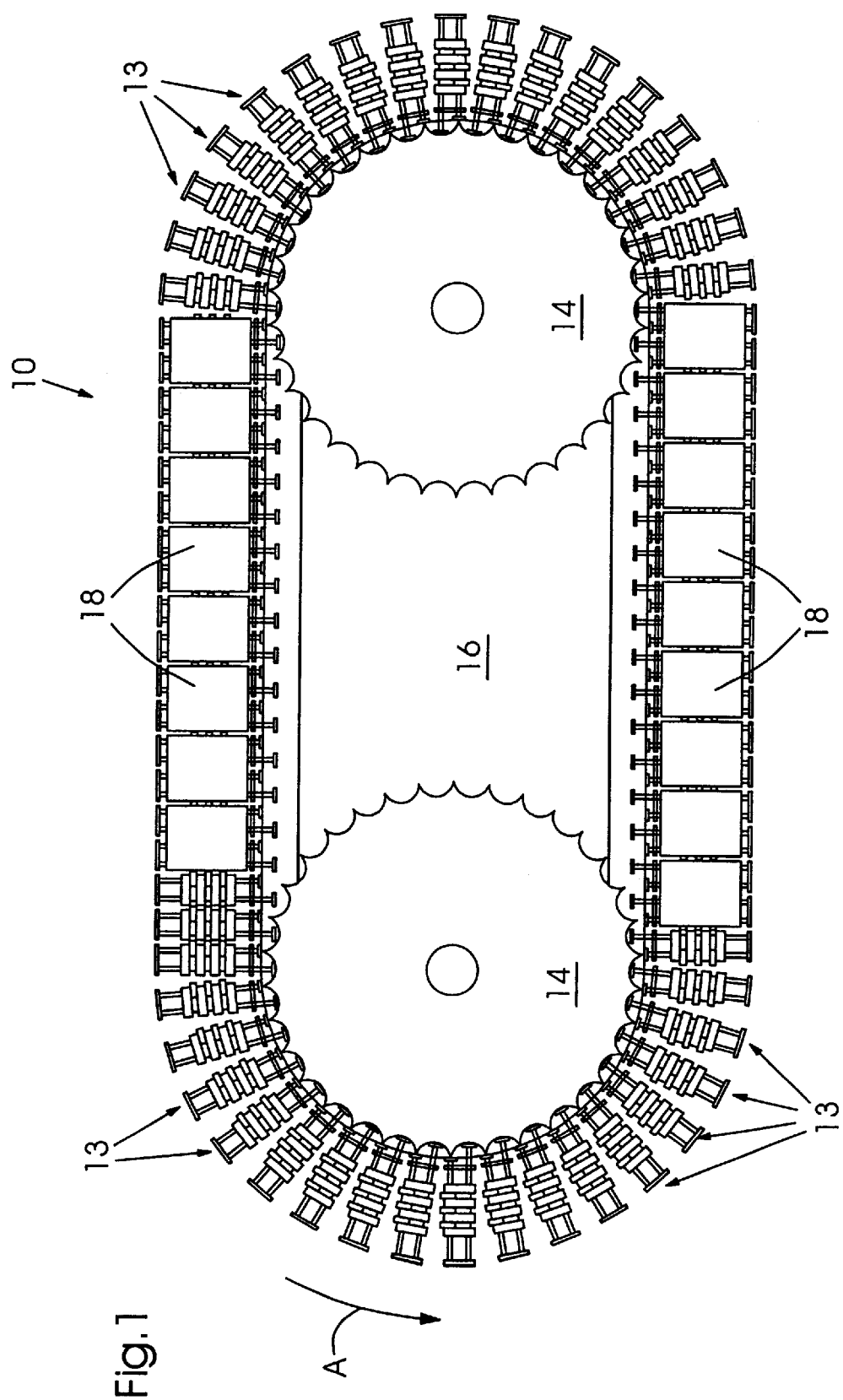
FIG. 1 is a schematic plan view of an exemplary collator embodying the present invention.

Referring to FIG. 1 a collator 10 comprises a plurality of receiving units 13, so-called compilers, moving along a conveying path in a direction given by the arrow A. Each of the receiving units has a receiving location, for example, a pocket for receiving flat products and a feeding mechanism for collating a plurality of flat products in a given order in the pocket. The plurality of receiving units 13 are arranged in an endless loop and travel around sprocket wheels 14 mounted on a central frame 16. At infeed stations 18 piles of flat products are arranged where single flat products of the piles are to be delivered to the pockets. The infeed stations 18 may be arranged at various locations along the path and are at least of the number of signatures which shall be delivered to each pocket but may be more. A single flat product such as a sheet or signature 20 (FIG. 3) is fed from the pile of flat products of each infeed station 18 to one of the receiving units 13 when a receiving unit 13 passes one of the infeed stations 18 beneath. When a malfunction of the feeder mechanism occurs it is possible that either no flat product (miss feed) or a wrong number of flat products (double feed) is delivered to the receiving location 13.

When a miss or double feed is detected the system that controls the collating process can send a signal to all the downstream infeed stations 18 to inhibit the feeding of signatures into the same receiving unit. The partly assembled book in this unit is then rejected at the end of the collating process. In the case of selective collating, where books of a custom make up are created by feeding or not feeding from all the available feed locations the control system either causes the book to be made again, or a substitute book is entered into the product stream to take its place.

Figure 2:
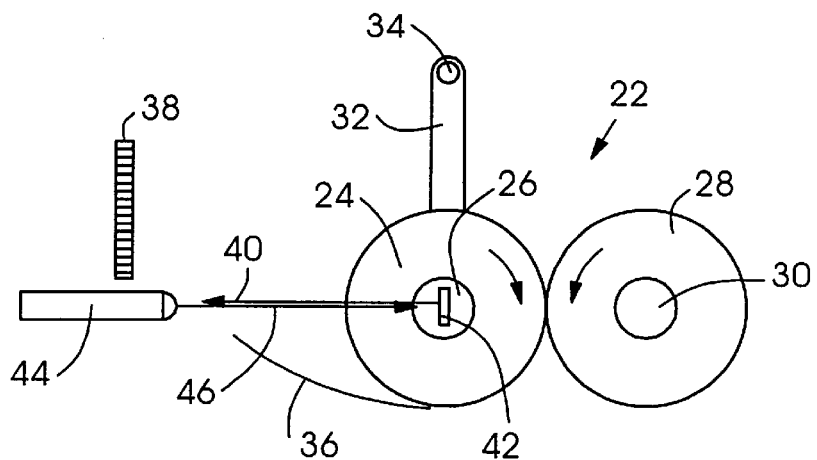
FIG. 2 is a schematic view of a portion of an exemplary thickness measurement device according to the present invention when no sheet is fed.

FIG. 2 shows a schematic side view of a possible feeding mechanism 22 for feeding a sheet or signature 20 (FIG. 3) from a pile of signatures to a receiving pocket. The feeding mechanism 22 includes a first roller 24 having a first shaft 26 a second roller 28 having a second shaft 30. The first roller is coupled to a lever arm 32 which is rotatably mounted on an axle 34 defining an axis. The first roller 24 therefore is rotatable about the axle 34 and movable along a path 36. A first reflecting element 42 which may for example be a mirror, a metal, a metallized surface or any other reflecting surface is arranged on the first roller 24, for example, on the shaft 26. The first reflecting element 42 reflects incident light emitted from a light source 44 which may for example be a laser, which directs visible or invisible light to the first reflecting element 42. When no signature is fed, the rollers 24 and 28 which are arranged against each other, are in close contact to each other and can be in touch. In this state the movable first roller 24 is not deflected. The light beam 46 which is directed from the light source 44 to the first reflecting element 42 therefore is reflected in a direction given by the reflected beam 40, which is dependent on the fixed angular position of the first reflecting element 42 with respect to the roller 24. In the example given in FIG. 2 the reflected beam 40 is reflected backwards in the direction of the light source 44 and does not hit a first sensor element 38 being arranged apart from the feeding mechanism 22.

Figure 3:
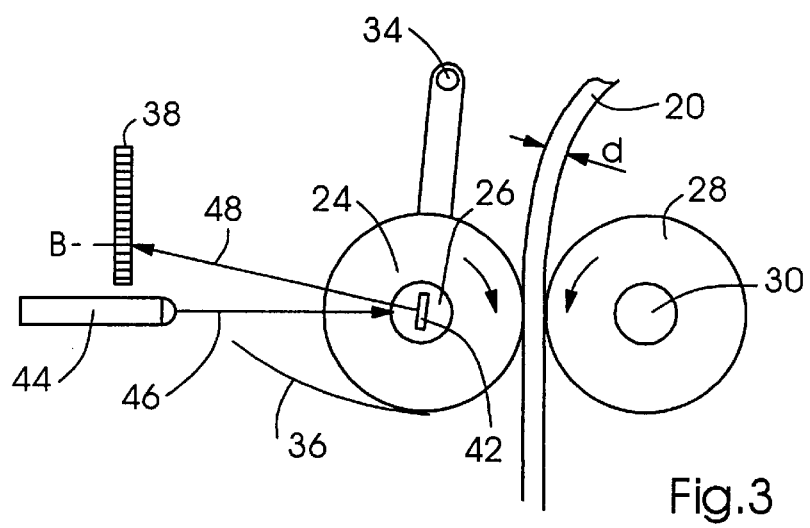
FIG. 3 is a schematic view of a portion of an exemplary thickness measurement device according to the present invention, illustrating a sheet material being fed between a pair of roller during normal feed.

When a signature 20 is fed from the pile of signatures to the receiving pocket it enters the nip between the rollers 24 and 28 as schematically shown in FIG. 3. Depending on the thickness d of the signature 20 the movable roller 24 is rotated about the axis defined by the axle 34 and deflected to a certain amount corresponding to the thickness of the signature 20. Consequently the first reflecting element 42 which is fixedly arranged on the first shaft 26 is rotated and reflects the incident light 46 from the light source 44 to a direction given by the reflected beam 48. Therefore, in the deflected state the reflected beam 48 falls onto the first sensor element 38 which is capable to detect the light and especially the wavelength of the light emitted by the light source 44. The reflected light beam hits the sensor element 38 at a position B which corresponds to the value of the thickness of one signature.

Figure 4:
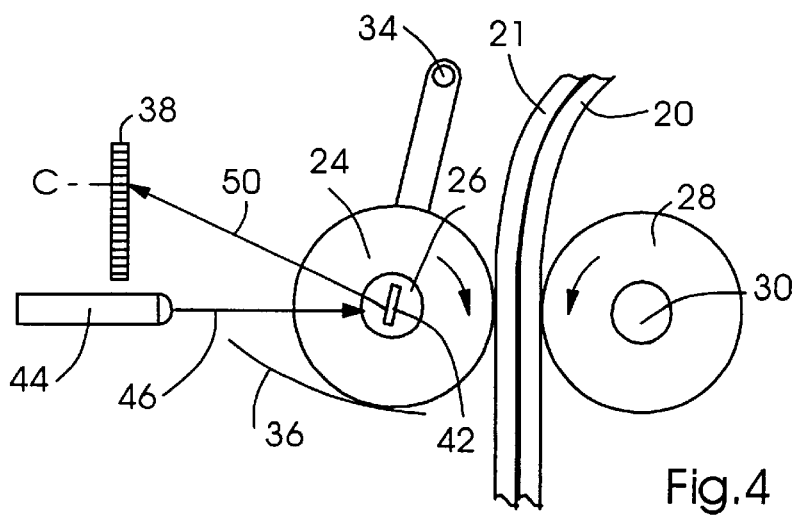
FIG. 4 is a schematic view of a portion of an exemplary thickness measurement device according to the present invention, illustrating a sheet material being fed between a pair of roller during malfunction of the feeder.

If a double feed occurs this may for example result in a feeding of two signatures 20, 21 from the pile of signatures to the receiving pockets as schematically shown in FIG. 4. When two signatures 20, 21 are fed from the pile of signatures to the receiving pocket, both enter the nip between the rollers 24 and 28. The movable roller 24 is rotated about the axis defined by the axle 34 and deflected to a certain amount along path 36 corresponding to the accumulated thicknesses of the first signature 20 and the second signature 21. The sum of the thicknesses is substantially equal to a value of twice the thickness d. As a consequence the amount of angular rotation of the first reflecting element 20 is greater than in the case of normal feed and a light beam 46 which is directed from the light source 44 to the first reflecting element 42 is reflected to a direction given by the reflected light beam 50 which is different to that of the reflected light beam 48 of FIG. 3. Therefore in the more deflected state the reflected beam 50 falls onto the first sensor element 38 at a position C which corresponds to the value of the thickness of two signatures.

It is therefore possible to determine the thickness of the flat product or products by simply evaluating the position at which the light beam 48, 50 reflected by the first reflecting element hits the first sensor element 38. It is also possible to achieve some averaging of the thickness of the signatures when a certain number of signatures is fed from the pile to the pocket and the corresponding hit points at which the reflected beam hits the sensor element are averaged or regarded as a valid hit range.

Figure 5:
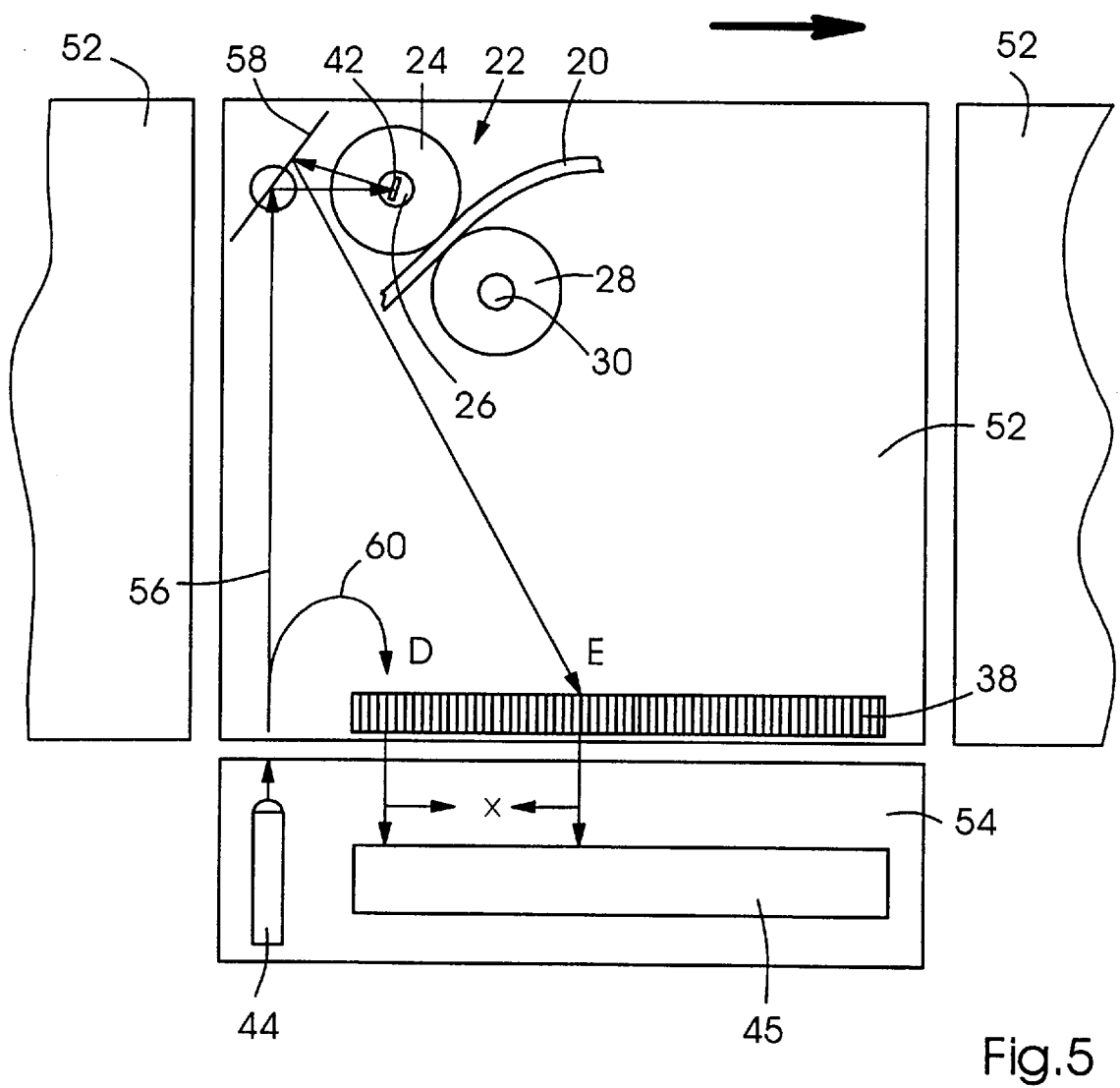
FIG. 5 is a schematic side view of a further exemplary embodiment of a thickness measurement device according to the present invention.

Referring now to FIG. 5 another embodiment of a feeding apparatus according to the present invention is shown. The feeding apparatus includes a plurality of first parts 52 and a single second part 54 where the first parts 52 are movable relative to the second part 54, for example, in the direction given by the arrow. The first part 52 is arranged on the transport device, for example, on each of the receiving units of the conveyor 10. It comprises a feeding mechanism 22, a first reflecting element 42 arranged on a first movable drum 24 and a first sensor element 38. The second part 54 is arranged stationary and apart from the first parts 52 and comprises a light source 44 and an evaluation unit 45 for evaluating the sensor signals generated by the first sensor element 38. The evaluation unit can include a microcomputer especially for calculating the thickness of the sheet or signature. The feeding mechanism 22 includes the first roller 24 having a first shaft 26 and a second roller 28 having a second shaft 30. The first roller 24 is deflectable and is deflected when a sheet or signature 20 enters the nip between the first and second roller. The first reflecting element 42 is arranged fixedly and in a definite angular position with respect to the first roller 24, and can be mounted on a first axle 26 extending through the first roller 24. The first part 52 can have light directing means including, for example, a first optical fiber cable 56 and a mirror 58 for guiding light from the stationary light source 44 to the first reflecting element. In a case where the light emitted by the light source 44 is guided directly to the first reflecting element 42 via the first optical fiber cable 56 the mirror 58 is not necessary for guiding the emitted light from the light source, to the first reflecting element 42. Furthermore, in the first part 52 there can be arranged a second optical fiber cable 60 for guiding light from the light source 44 to a definite position D of the first sensor element 38.

When one of the first parts 52 of the thickness measurement apparatus passes the second part 54 light will be directed from the light source 44 to the passing end of the first and second fiber optic cables 56 and 60. Light travels through the cables 56 and 60 and is directed to the reflecting element 42 via cable 56 and to the sensor element 38 via cable 60 where it hits the sensor element 38 at a definite position indicated by the letter "D". Hit point "D" generates the a reference sensor signal which is transmitted to the evaluation unit 45, being arranged on the second part 54. When a flat product is fed between the nip of the two rollers 24, 26 the first roller 24 is displaced. This displacement of the roller leads to a change of the angular position of the first reflecting element 42 and the light reflected by this element is directed to the mirror 58 and then to the first sensor element 38 to a position indicated by the letter "E". The sensor element 38 can for example be a photo detector array which is able to detect the wave length of the light source 44. Hit point "E" on the sensor element 38 generates a displacement signal which then is transmitted to the evaluation unit 45 arranged on the second part 54.

As the light could also be directed to the first sensor element 38 directly when the sensor is arranged properly, the provision of the mirror 58 is only optional. As the difference between hit point D at which the reference light beam hits the sensor element and the hit point E at which the displaced light beam hits the sensor element corresponds to the thickness of the product it is possible to calculate this thickness when both signals are transferred to an evaluation unit 45. Instead of transmitting the positions of the hit points "D" and "E" it is also possible to transmit a value corresponding to the difference of both hit points.

Figure 6:
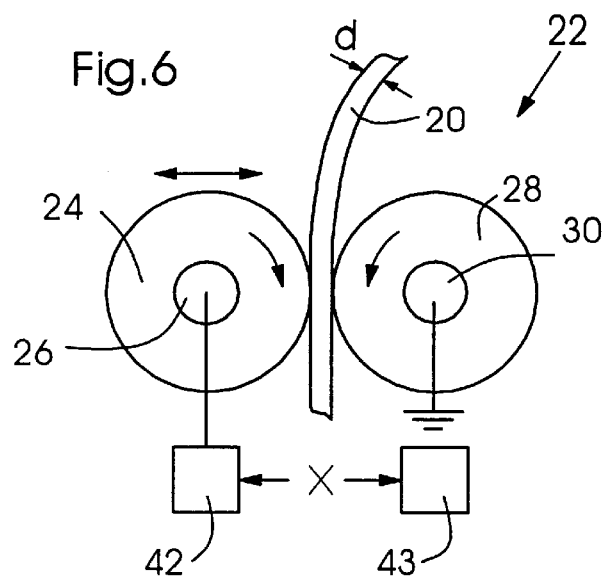
FIG. 6 is a schematic side view of a further embodiment of a thickness measurement device according to the present invention during correct feeding.
Figure 7:
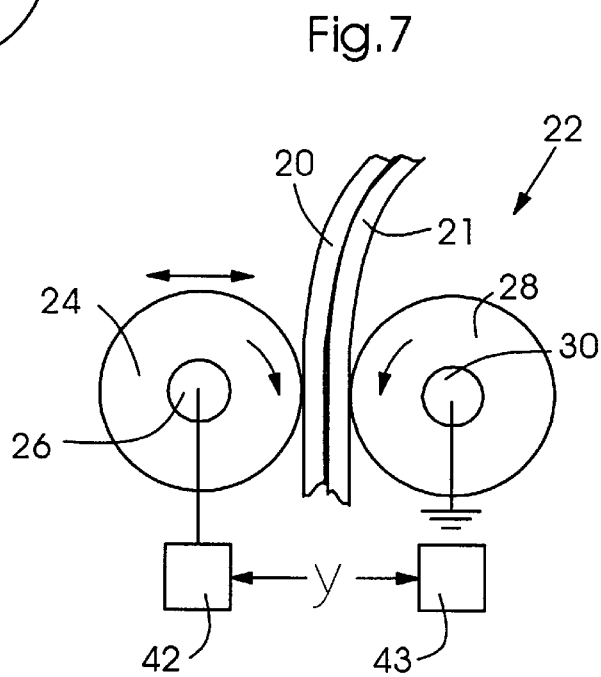
FIG. 7 is a schematic side view of a further embodiment of a thickness measurement device according to the present invention during double feeding.

In a further embodiment of the invention the apparatus comprises a first reflecting element 42 and a second reflecting element 43 as shown in FIGS. 6 and 7. The first reflecting element 42 is coupled to the movable roller 24 and can be arranged or connected to the first shaft 26 of the first roller 24. The movable roller 24 is deflected linearly, as indicated by the arrow, if a signature 20 enters the nip between the movable roller 24 and the fixed roller 28 where the amount of deflection is given by the thickness of the signature 20. The second reflecting element 43 is mounted on the receiving unit 13 in a fixed position, for example, on the receiving pocket 20 or on the fixed roller 28. The thickness d of the sheet or sheets fed between the rollers 24 and 28 corresponds to the distance x of the first reflecting element 42 and the second reflecting element 43 and may for example be calculated from the difference of distance x of the two reflecting elements 42, 43 in an undeflected state, and the distance of the reflecting elements 42, 43 in the deflected state where at least one signature 20 is between the first roller 24 and the second roller 28.

The second reflecting element 43 can be arranged fixedly on a suitable position of the receiving unit 13 or can be attached to a fixed part of the second roller 28, especially the second shaft 30.

In order to calculate the thickness x of the sheets fed through the nip and in order to decide if a miss or double feed has happened, the distance x or y (FIG. 7), has to be evaluated and compared to a previously stored distance or value indicating a correct thickness of the signature being fed. This previously stored distance can be measured prior to the run of the machine in a so-called learn-mode where valid values of thickness or a valid range of thickness of one sheet can be evaluated and stored.

Figure 8:
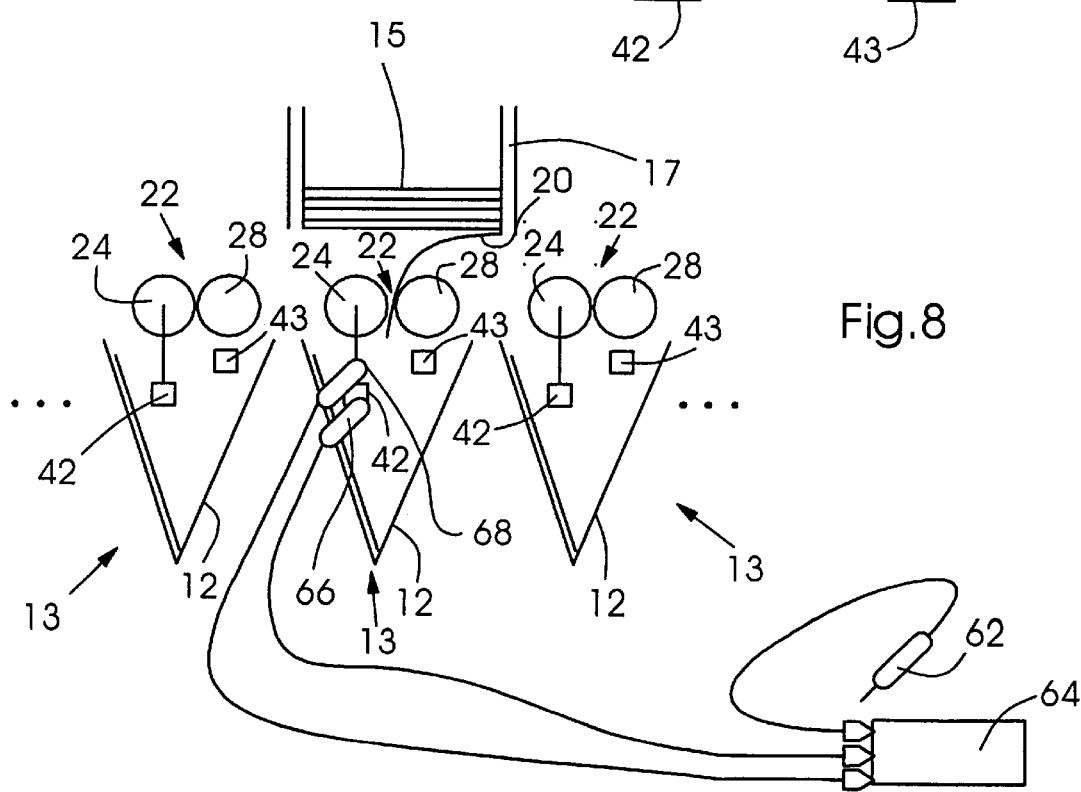
FIG. 8 is a schematic side view of a part of an exemplary collating apparatus according to the present invention.

A more detailed measurement arrangement is shown in FIG. 8, where an encoder 62 is mounted on the machine to precisely measure the movement of the machine. The assembly comprises a plurality of receiving units 13, each having a receiving pocket 12 defining a receiving location for receiving signatures from a pile of signatures 15 where each of the pockets is coupled to a feeding mechanism 22. Each of the feeding mechanisms comprises a movable roller 24, a fixed roller 28, a first reflecting element 42 being movable together with the movable roller 24 and a fixed reflecting element 43 which is not movable when a signature or sheet enters the nip. The receiving units 13 are arranged sequentially and move past each of a plurality of hoppers 17 along a predetermined path as shown in FIG. 1. As soon as the signature 20 enters the nip between the movable roller 24 and the fixed roller 28, the movable roller 24 is deflected together with the first reflecting element 42. A microprocessor controller 64, for example, a computer, monitors the first and second reflecting elements 42 and 43 via a suitable first monitoring element 66 and a second monitoring element 68. Both monitoring elements can include a sensor element for sensing light from the reflecting elements 42 and 43, where light may be directed to the reflecting elements from a separate light source(not shown) or from the monitoring elements 66, 68, themselves. This could, for example, be achieved by integrating a laser diode or another light emitting diode (LED) into the light receiving elements 66, 68. As soon as the microprocessor controller 64 gets a signal indicating that a first reflecting element 42 passes the first monitoring element 66, it starts counting the pulses generated by the encoder 62. The pulses can correspond to the travel distance of the receiving unit 13. Upon a second signal of the second monitoring element indicating that the second reflecting element 43 passes the second monitoring element, the microprocessor controller 64 stops counting the pulses. The number of pulses therefore corresponds to the distance of the first and the second reflecting element 42 and 43 and to the thickness of the sheet or sheets being fed between the first movable roller 24 and the second fixed roller 28, respectively. By comparing the number of counts with a predetermined number of counts or a predetermined count range it is possible to decide if a miss feed or double feed has happened. The predetermined number of counts or count ranges can be stored previously in a table for each receiving unit.

If the calculated distance is twice the deflection distance expected, it indicates that a fault double feed has occurred, which can be indicated to an operator or communicated to the hoppers downstream as already described above. By raising the pulses produced by the encoder per machine cycle, the accuracy of the measurement can be raised. The microprocessor can be programmed by learning the number of encoded counts for both an empty machine and a nominal paper thickness for a given run and it is possible to store that information in a table or by another software method for each receiving unit. The storage of information for each receiving unit accommodates the difference and tolerance errors in the manufacture of each.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:

1. An apparatus for measuring the thickness of flat products comprising:
   a first and a second roller, the first roller being arranged against the second roller to form a nip therebetween for receiving flat product, wherein the first roller is deflectable when a flat product enters the nip;
   a first reflecting element arranged on the first roller for reflecting incident light;
   a light source for directing light to said first reflecting element;
   a first sensor element for sensing light reflected from said first reflecting element and for producing a first sensor signal; and
   an evaluating unit coupled to said first sensor element for calculating the thickness based on said first sensor signal, wherein the first and second rollers and said first sensor element are mounted on a movable transporting device, and said light source and said evaluating unit are arranged stationary, apart from said movable transporting device.

2. An apparatus according to claim 1, wherein said first reflecting element is arranged on a shaft extending through the first roller.

3. An apparatus according to claim 2, wherein said first reflecting element is a separate reflecting element mounted on the shaft.

4. An apparatus according to claim 2, wherein said first reflecting element is a reflecting area of the shaft.

5. An apparatus according to claim 1, wherein said evaluating unit calculates the thickness of the flat product based on a value corresponding to a distance between the first and second rollers.

6. An apparatus according to claim 5, wherein said value corresponds to an amplified value of the distance between the first and second rollers.

7. An apparatus according to claim 1, wherein said first roller is coupled to a shaft which is pivotally mounted on an axle.

8. An apparatus according to claim 1, wherein the first roller comprises a mechanical linkage which multiplies a deflection caused by the flat product.

9. An apparatus according to claim 1, wherein said movable transporting device further comprises:
   first light directing means for directing light from said stationary light source to said first reflecting element when the movable transporting device passes the light source.

10. An apparatus according to claim 9, wherein said first light directing means comprises:
    an optical fiber.

11. An apparatus according to claim 9, wherein said movable transporting device comprises:
    second light directing means for directing the light reflected from said first reflecting element to the first sensor element for producing a displacement signal on said first sensor element.

12. An apparatus according to claim 1, wherein said movable transporting device comprises:

third light directing means for directing light from said stationary light source to said first sensor element for producing a reference signal on the first sensor element.

13. An apparatus according to claim 12, wherein said evaluating unit calculates the thickness of the flat product based on said reference signal and said displacement signal.

14. An apparatus according to claim 1 further comprising:
a second reflecting element arranged on said movable transporting device for reflecting incident light of said light source.

15. An apparatus according to claim 14, comprising:
a second sensor element for sensing the light reflected from said second reflecting element and for producing a second sensor signal.

16. An apparatus according to claim 15, comprising:
an encoder for generating pulses.

17. An apparatus according to claim 16 comprising:
a microprocessor arranged stationary for monitoring the pulses of said encoder and said first and second sensor signals.

18. An apparatus according to claim 17, wherein said microprocessor calculates the thickness of the flat product based on a number of counted pulses of said encoder during a time interval between said first sensor signal and said second sensor signal.

19. An apparatus for forming sheet material assemblages, comprising:
a plurality of hoppers for holding sheet material;
a plurality of receiving units each having a receiving location;
a plurality of feeding mechanisms for performing sheet feeding operations to feed sheet flat products from said hoppers to said receiving locations and being coupled to the receiving units;
driving means for sequentially moving each of said receiving units past each of said hoppers in turn;
a plurality of first reflecting elements for reflecting incident light, at least one of said first reflecting elements being attached to each of said feeding mechanisms;
a plurality of first sensor elements for sensing light reflected from said first reflecting elements, at least one of said sensor elements being attached to each of said plurality of receiving units; and
a light source for directing light to said first reflecting elements, said light source being arranged stationary and apart from the receiving units.

20. An apparatus according to claim 19, wherein each of said receiving units comprises:
first light directing means for directing light from said light source to said first reflecting elements when the receiving unit passes the light source.

21. An apparatus according to claim 20, wherein said first light directing means comprises:
an optical fiber.

22. An apparatus according to claim 19, wherein each of said receiving units comprises:
second light directing means for directing the light reflected from said first reflecting elements to the first sensor elements for producing a displacement signal on said first sensor elements.

23. An apparatus according to claim 22, wherein each of said receiving units comprises:
third light directing means for directing light from said stationary light source to said first sensor elements for producing a reference signal on the first sensor elements.

24. An apparatus for forming sheet material assemblages, comprising:
a plurality of hoppers for holding sheet material;
a plurality of receiving units, each having a receiving location;
a plurality of feeding mechanisms for performing sheet feeding operations to feed flat products from said hoppers to said receiving locations and being coupled to the receiving units;
driving means for sequentially moving each of said receiving units past each of said hoppers in turn;
a plurality of first reflecting elements for reflecting incident light from a light source, at least one of said first reflecting elements being attached to each of said feeding mechanisms;
a plurality of second reflecting elements for reflecting incident light from a light source, at least one of said second reflecting elements being attached to each of said receiving units;
a light source for directing light to said first and second reflecting elements, said light source being arranged stationary and apart form the receiving units;
a first sensor element for sensing light reflected from one of the first reflecting elements, said first sensor element being arranged stationary, apart from the receiving units;
a second sensor element for sensing light reflected from one of the second reflecting elements, said second sensor element being arranged stationary, apart from the receiving units;
an encoder for generating pulses, being arranged stationary and apart from the receiving units; and
a microprocessor arranged stationary and apart from the receiving units and being coupled to said encoder and said first and second sensor elements for monitoring pulses of said encoder and said first and second sensor signals.

25. An apparatus according to claim 24, wherein each of said feeding mechanisms comprises:
a first roller and a second roller, the first roller being arranged against the second roller to form a nip therebetween for receiving the flat products, wherein the first roller is deflectable when a flat product enters the nip, and wherein said first reflective element is mounted on said first roller.

26. An apparatus according to claims 25, wherein each of said receiving units comprises:
first light directing means for directing light from said stationary light source to said first and second reflecting elements when the receiving unit passes the light source.

27. Apparatus according to claim 26, wherein said first light directing means comprises:
an optical fiber.

28. An apparatus according to claim 24, wherein each of said receiving units comprises:
second light directing means for directing the light reflected from said first and second reflecting elements to the first and second sensor elements for producing said first and second sensor signals.

* * * * *